United States Patent
Bookbinder et al.

(10) Patent No.: US 9,359,251 B2
(45) Date of Patent: Jun. 7, 2016

(54) ION EXCHANGED GLASSES VIA NON-ERROR FUNCTION COMPRESSIVE STRESS PROFILES

(71) Applicant: Corning Incorporated, Corning, NY (US)

(72) Inventors: Dana Craig Bookbinder, Corning, NY (US); Richard Michael Fiacco, Corning, NY (US); Timothy Michael Gross, Corning, NY (US); Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/772,888

(22) Filed: Feb. 21, 2013

(65) Prior Publication Data
US 2013/0224492 A1  Aug. 29, 2013

Related U.S. Application Data

(60) Provisional application No. 61/604,654, filed on Feb. 29, 2012.

(51) Int. Cl.
*C03C 21/00* (2006.01)
*C03C 23/00* (2006.01)

(52) U.S. Cl.
CPC ............. *C03C 21/002* (2013.01); *C03C 23/007* (2013.01); *Y10T 428/315* (2015.01)

(58) Field of Classification Search
None
See application file for complete search history.

(56) References Cited

U.S. PATENT DOCUMENTS

| 1,960,121 A | 5/1934 | Moulton |
| 3,107,196 A | 10/1963 | Acloque |
| 3,357,876 A | 12/1967 | Rinehart |
| 3,489,097 A | 1/1970 | Gemeinhardt |
| 3,673,049 A | 6/1972 | Giffon et al. |
| 3,737,294 A | 6/1973 | Dumbaugh et al. |

(Continued)

FOREIGN PATENT DOCUMENTS

| AU | 6452265 | 10/1965 |
| EP | 2263979 | 12/2010 |

(Continued)

OTHER PUBLICATIONS

European Patent Office; International Search Report; Mail Date: Aug. 27, 2013; pp. 1-3.

(Continued)

*Primary Examiner* — David Sample
(74) *Attorney, Agent, or Firm* — Timothy M. Schaeberle (57) ABSTRACT

Glasses with compressive stress profiles that allow higher surface compression and deeper depth of layer (DOL) than is allowable in glasses with stress profiles that follow the complementary error function at a given level of stored tension. In some instances, a buried layer or local maximum of increased compression, which can alter the direction of cracking systems, is present within the depth of layer. Theses compressive stress profiles are achieved by a three step process that includes a first ion exchange step to create compressive stress and depth of layer that follows the complimentary error function, a heat treatment at a temperature below the strain point of the glass to partially relax the stresses in the glass and diffuse larger alkali ions to a greater depth, and a re-ion-exchange at short times to re-establish high compressive stress at the surface.

17 Claims, 9 Drawing Sheets

(56) References Cited

U.S. PATENT DOCUMENTS

| | | | |
|---|---|---|---|
| 3,746,526 | A | 7/1973 | Giffon |
| 3,765,855 | A | 10/1973 | Larrick |
| 3,844,754 | A | 10/1974 | Grubb et al. |
| 3,907,577 | A | 9/1975 | Kiefer et al. |
| 3,931,438 | A | 1/1976 | Beall et al. |
| 3,958,052 | A | 5/1976 | Galusha et al. |
| 4,042,405 | A | 8/1977 | Krohn et al. |
| 4,055,703 | A | 10/1977 | Rinehart |
| 4,102,664 | A | 7/1978 | Dumbaugh, Jr. |
| 4,214,886 | A | 7/1980 | Shay et al. |
| 5,342,426 | A | 8/1994 | Dumbaugh, Jr. |
| 5,559,060 | A | 9/1996 | Dumbaugh, Jr. et al. |
| 6,516,634 | B1 * | 2/2003 | Green et al. .............. 65/30.14 |
| 6,518,211 | B1 | 2/2003 | Bradshaw et al. |
| 7,514,149 | B2 | 4/2009 | Bocko et al. |
| 7,727,917 | B2 | 6/2010 | Shelestak et al. |
| 8,007,913 | B2 | 8/2011 | Coppola et al. |
| 8,586,492 | B2 | 11/2013 | Barefoot et al. |
| 8,759,238 | B2 | 6/2014 | Chapman et al. |
| 8,778,820 | B2 | 7/2014 | Gomez et al. |
| 2005/0090377 | A1 | 4/2005 | Shelestak et al. |
| 2006/0127679 | A1 | 6/2006 | Gulati et al. |
| 2007/0218262 | A1 | 9/2007 | Degand et al. |
| 2008/0286548 | A1 | 11/2008 | Ellison et al. |
| 2009/0142568 | A1 | 6/2009 | Dejneka et al. |
| 2010/0009154 | A1 | 1/2010 | Allan et al. |
| 2010/0035038 | A1 | 2/2010 | Barefoot et al. |
| 2010/0035745 | A1 | 2/2010 | Murata |
| 2010/0190038 | A1 | 7/2010 | Osakabe et al. |
| 2010/0200804 | A1 | 8/2010 | Woodruff et al. |
| 2010/0215996 | A1 | 8/2010 | Wendling et al. |
| 2011/0201490 | A1 | 8/2011 | Barefoot et al. |
| 2011/0294648 | A1 | 12/2011 | Chapman et al. |
| 2012/0048604 | A1 | 3/2012 | Cornejo et al. |
| 2012/0052271 | A1 | 3/2012 | Gomez et al. |
| 2012/0194974 | A1 * | 8/2012 | Weber et al. ............. 361/679.01 |
| 2014/0093702 | A1 | 4/2014 | Kitajima |

FOREIGN PATENT DOCUMENTS

| | | |
|---|---|---|
| EP | 2397449 | 12/2011 |
| EP | 2540682 | 1/2013 |
| GB | 1012367 | 12/1965 |
| JP | 2004259402 | 9/2004 |
| JP | 2011057504 | 3/2011 |
| WO | 2010/002477 | 1/2010 |
| WO | 2010002477 | 1/2010 |
| WO | 2010005578 | 1/2010 |
| WO | 2010016928 | 2/2010 |
| WO | 2011103798 | 9/2011 |
| WO | 2011149811 | 12/2011 |
| WO | 2011149812 | 12/2011 |
| WO | 2012027660 | 3/2012 |
| WO | 2013/016157 | 1/2013 |
| WO | 2013016157 | 1/2013 |

OTHER PUBLICATIONS

Abrams et al; "Fracture behavior of engineered stress profile soda lime silicate glass"; Journal of Non-Crystalline Solids; 321, (2003) 10-19.

Greaves et al; "Inorganic Glasses, glass-forming liquids and amorphizing solids" Advances in Physics; vol. 56, No. 1; 2007 pp. 1-166.

Green; "Section 2. Residual stress, brittle fracture and damage; Critical parameters in the processing of engineered stress profile glasses"; Journal of Non-Crystalline Solids, 316 (2003) 35-41.

Hampshire; "Oxynitride glasses, their properties and crystallization—a review"; Journal of Non-Crystalline Solids; vol. 316, 2003; pp. 64-73.

Le Bourhis; "Hardness"; Glass Mechanics and Technology; 2008; pp. 170-174.

Shen et al; "Control of concentration profiles in two step ion exchanged glasses"; Phys. Chem. Glasses, 2003 44 (4), 284-92.

Shen et al; "Variable-temperature ion-exchanged engineered stress profile (ESP) glasses"; J. Am. Ceram. Soc., 86 [11] 1979-81 (2003).

Smedskjaer "Effect of thermal history and chemical composition on hardness of silicate glasses"; Journal of Non-Crystalline Solids 356 (2010); pp. 893-897.

Varshneya; "Fundamentals of Inorganic Glasses"; 2nd edition, Society of Glass Technology, 2006, pp. 513-521, XP002563094.

Varshneya; "Microhardness vs. Glass Composition"; Fundamentals of Inorganic Glasses; 2006; p. 208, paragraph 7.

* cited by examiner

ION EXCHANGED GLASSES VIA NON-ERROR FUNCTION COMPRESSIVE STRESS PROFILES

CROSS-REFERENCE TO RELATED APPLICATIONS

This application claims the benefit of priority under 35 U.S.C. §119 of U.S. Provisional Application Ser. No. 61/604,654 filed on Feb. 29, 2012, the content of which is relied upon and incorporated herein by reference in its entirety.

BACKGROUND

Chemical strengthening, also called ion-exchange (IOX), of glass refers to the exchange of smaller cation (e.g., monovalent alkali metal cations such as $Li^+$ and $Na^+$) in the glass for larger monovalent cations (e.g., $K+$) in an external medium, such as a molten salt bath at temperatures below the strain point of the glass. The ion exchange process is used to impart a compressive stress profile extending from the surface of the glass to a particular depth following a complementary error function. High compressive stress gives high strength in bending as long as the flaw is encompassed in the depth of the compressive layer (depth of layer, or "DOL").

The stored compressive stress from both surfaces of the glass is balanced by stored tension, the allowable limit of which is set by the frangibility limit for a given glass thickness. The limits of compressive stress and depth of layer are determined by the various allowable combinations that follow the complementary error function and remain below the frangibility limit. The stored compressive stress is represented by the area under the complementary error function from the surface to the depth of layer.

SUMMARY

The present disclosure provides glasses with compressive stress profiles that allow higher surface compression and deeper depth of layer (DOL) than is allowable in glasses with stress profiles that follow the complementary error function at a given level of stored tension. In some instances, a buried layer or local maximum of increased compression, which can alter the direction of cracking systems, is present within the depth of layer. Theses compressive stress profiles are achieved by a three step process that includes a first ion exchange step to create compressive stress and depth of layer that follows the complimentary error function, a heat treatment at a temperature below the strain point of the glass to partially relax the stresses in the glass and diffuse larger alkali ions to a greater depth, and a re-ion-exchange at short times to re-establish high compressive stress at the surface.

Accordingly, one aspect of the disclosure is to provide a glass having a surface and a thickness t. The glass comprises a first region under a compressive stress, the first region extending from the surface to a depth of layer DOL in the glass, wherein the compressive stress CS has a maximum $CS_1$ at the surface and varies with distance d from the surface according to a function other than a complementary error function; and a second region under a tensile stress CT, the second region extending from the depth of layer into the glass.

A second aspect of the disclosure is to provide an ion exchanged glass having a surface and a thickness t. The glass comprises a first layer under a compressive stress CS and extending to a depth of layer DOL in the glass. The first region comprises a first segment in which the compressive stress CS varies according to a first function and a second segment in which the compressive stress CS varies according to a second function, and wherein the first function is different than the second function.

A third aspect of the disclosure is to provide a method of providing a glass with a compressive stress in a layer extending from a surface of the glass to a depth of layer in the glass. The method comprises: ion exchanging the glass with a salt comprising first cations to a first compressive stress and a first depth of layer, wherein the first compressive stress varies with distance in the glass according to a complementary error function; relaxing stresses within the glass and diffusing the first cations deeper into the glass; and re-ion exchanging the glass with a salt comprising the first cations to a second compressive stress at the surface, wherein the compressive stress varies with distance according to a function other than the complementary error function.

These and other aspects, advantages, and salient features will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified.

Figure 1:
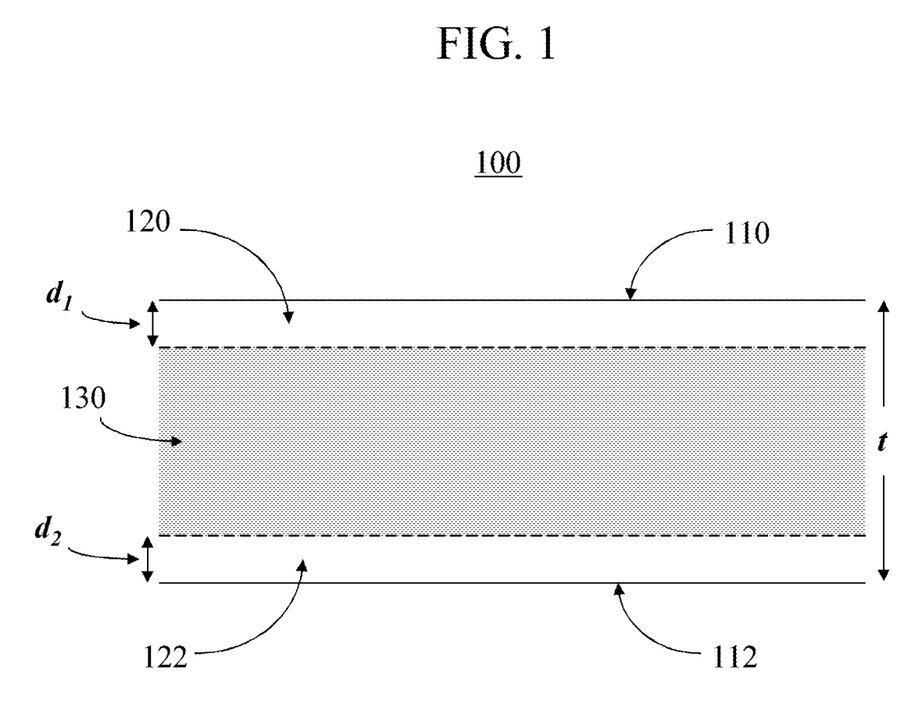
FIG. 1 is a cross-sectional schematic view of an ion exchanged planar glass article.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Chemical strengthening, also called ion-exchange (IOX), of glass refers to the exchange of smaller cation (e.g., monovalent alkali metal cations such as $Li^+$ and $Na^+$) in the glass for larger monovalent cations (e.g., K+) in an external medium, such as a molten salt bath, at temperatures below the strain point of the glass. The ion exchange process is used to impart a compressive stress profile extending from the surface of the glass to a particular depth following a complementary error function. High compressive stress gives high strength in bending as long as the flaw is encompassed in the depth of the compressive layer (depth of layer, or "DOL"). The stored compressive stress from both surfaces of the glass is balanced by stored tension, the allowable limit of which is set by the frangibility limit for a given glass thickness.

A cross-sectional schematic view of an ion exchanged planar glass article is shown in FIG. 1. Glass article 100 has a thickness t, first surface 110, and second surface 112. Glass article 100, in some embodiments, has a thickness t in a range from 0.05 mm up to about 4 mm. While the embodiment shown in FIG. 1 depicts glass article 100 as a flat planar sheet or plate, glass article 100 may have other configurations, such as three dimensional shapes or non-planar configurations. Glass article 100 has a first compressive layer 120 extending from first surface 110 to a depth of layer $d_1$ into the bulk of the glass article 100. In the embodiment shown in FIG. 1, glass article 100 also has a second compressive layer 122 extending from second surface 112 to a second depth of layer $d_2$. Glass article 100 also has a central region 130 that extends from $d_1$ to $d_2$. Central region 130 is under a tensile stress or central tension (CT), which balances or counteracts the compressive stresses of first and second compressive layers 120 and 122. The depth $d_1$, $d_2$ of first and second compressive layers 120, 122 protects the glass article 100 from the propagation of flaws introduced by sharp impact to first and second surfaces 110, 112 of glass article 100, while the compressive stress minimizes the likelihood of a flaw penetrating through the depth $d_1$, $d_2$ of first and second compressive layers 120, 122.

Figure 2:
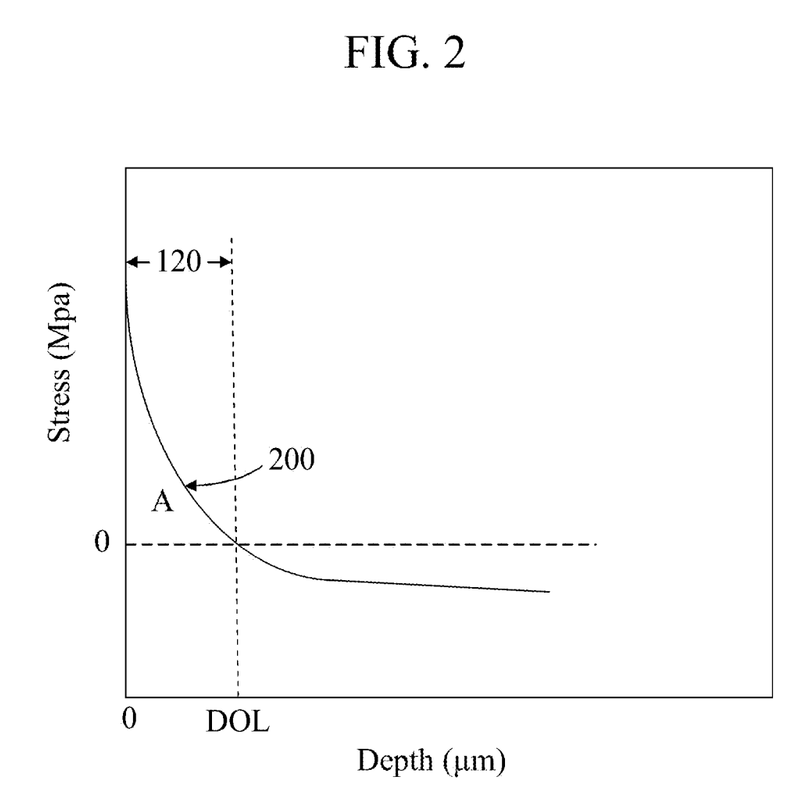
FIG. 2 is a plot of stress in an ion exchanged glass in which the compressive stress follows a complementary error function.

The limits of compressive stress and depth of layer are typically determined by the various allowable combinations that follow the complementary error function and remain below the frangibility limit. The stored compressive stress is represented by the area under the complementary error function from the surface to the depth of layer. As used herein, the terms "depth of layer" and "DOL" refer to zero stress point where the surface compression layer first transitions to tension. FIG. 2 is a plot of stress in an ion exchanged glass in which the compressive stress follows a complementary error function 200 in first compressive layer 120. The compressive stress has a maximum value at the surface of the glass (depth=0 µm) and steadily decreases through first compressive layer 120 until the depth of layer DOL is reached, at which point the compressive stress transitions to tension and the total stress is equal to zero.

A deep compressive layer provides damage resistance; i.e. the ability to retain strength as the flaw depths become larger with more severe contacts with the glass. While it may be desirable to achieve both high compressive stress and deep depth of compressive layer, a limit is set by the transition to frangible behavior as the stored energy exceeds a safe limit, referred to herein as the "frangibility limit." The stored compressive stress is represented by the area A under the complimentary error function 200 from the surface to the depth of layer. The stored compressive stress from both surfaces is balanced by the stored central tension CT, the allowable limit of which is set by the frangibility limit for a given glass thickness. The limits of compressive stress and depth of layer are determined by the various allowable combinations that follow the complimentary error function 200 and remain below the frangibility limit.

As described herein, a chemically strengthened—i.e., ion exchanged—glass that is damage resistant for applications such as, but not limited to, cover glasses for portable and stationary electronic devices, architectural and automotive glazing/windows, and glass containers is provided. The glass has a first region under compressive stress (e.g., first and second compressive layers 120, 122 in FIG. 1) extending from the surface to a depth of layer DOL of the glass and a second region (e.g., central region 130 in FIG. 1) under a tensile stress or central tension CT extending from the depth of layer into the central or interior region of the glass.

Figure 3:
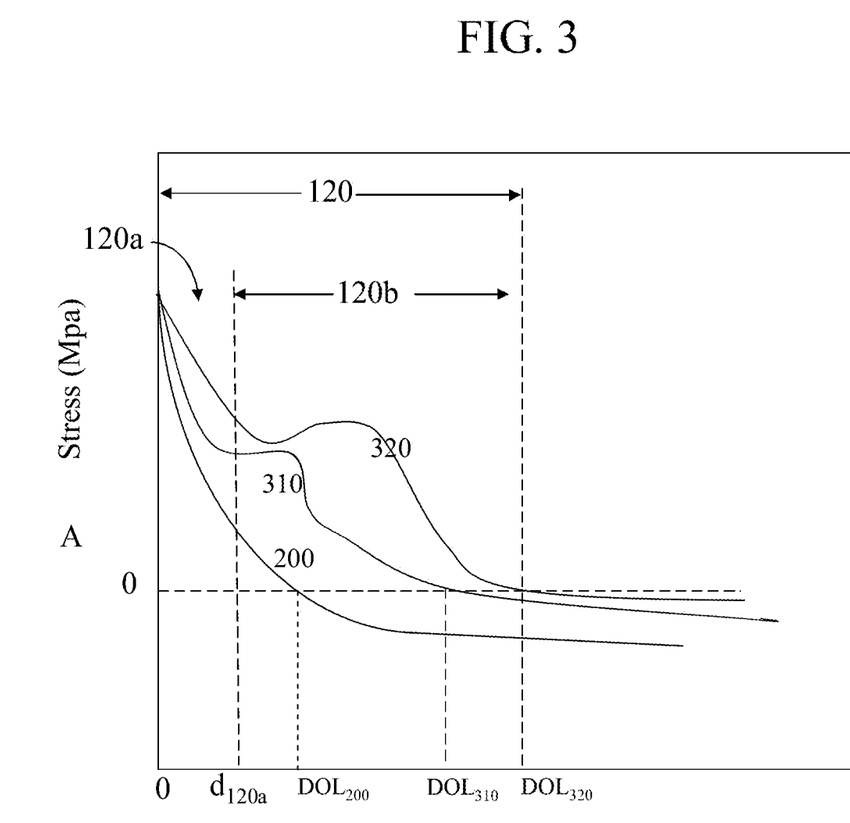
FIG. 3 is a schematic plot comparing examples of compressive stress profiles that do not follow complementary error functions with a compressive stress profile that follows a complementary error function.

The compressive stress CS has a maximum compressive stress $CS_1$ at its surface and a compressive stress that varies with distance d from the surface according to a function that is different from (i.e., other than) a complementary error function. Examples of such compressive stress functions 310, 320 of possible compressive stress profiles of the glasses described herein are schematically shown and compared to complementary error function 200 in FIG. 3. Referring to compressive stress function 320 in particular, region 120 (FIG. 1) comprises a first segment 120a in which compressive stress function 320 is a first complementary error function, and a second segment 120b, located between first segment 120a and central region 130, in which compressive stress follows a second function that differs from the first complementary error function.

As used herein, the terms "error function" and "Erf" refer to the function which is twice the integral of a normalized Gaussian function between 0 and $x/\sigma\sqrt{2}$, and the terms "complementary error function" and "Erfc" are equal to one minus the error function; i.e., Erfc(x)=1−Erf(x).

First segment 120a extends from first surface 110 to a depth $d_{120a}$ and defines the surface compression or compressive stress CS of glass 100. In some embodiments, the compressive stress is at least 400 MPa, in other embodiments, at least about 600 MPa, and in still other embodiments, at least about 800 MPa. The depth of layer DOL of each of first and second compressive layers 120, 122 is at least about 50 µm and, in some embodiments, at least about 100 µm.

The function or functions in second segment 120b may include a second complementary error function, a diffusion tail, or the like. Second segment 120b is located between $d_{120a}$ and the depth of layer DOL. Compressive stress functions 310, 320 in FIG. 3 each have at least one inflection point and the compressive stress reaches a local maximum $CS_2$ and/or local minimum $CS_3$ below the surface 110 of the glass. In some embodiments, first compressive layer 120 may comprise more than two segments with each segment having a compressive stress that follows a function other than the function characterizing adjacent segment or segments.

The stored compressive stress of both major surfaces (110, 112 in FIG. 1) is balanced by stored tension in the central region (130) of the glass, the allowable limit of which is set by the frangibility limit for a given glass thickness. The frangibility limit and frangibility are described in U.S. Pat. No. 8,075,999 by Kristen L. Barefoot et al., entitled "Strengthened Glass Articles and Method of Making," filed Aug. 7, 2009, and claiming priority to U.S. Provisional Patent Application No. 61/087,324, filed on Aug. 8, 2008, the contents of which are incorporated herein by reference in their entirety. As described in U.S. Pat. No. 8,075,999, frangibility or frangible behavior is characterized by at least one of: breaking of the strengthened glass article (e.g., a plate or sheet) into multiple small pieces (e.g., ≤1 mm); the number of fragments formed per unit area of the glass article; multiple crack branching from an initial crack in the glass article; and violent ejection of at least one fragment a specified distance (e.g., about 5 cm, or about 2 inches) from its original location; and combinations of any of the foregoing breaking (size and density), cracking, and ejecting behaviors. The terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glasses described herein, such external restraints are not used in determining the frangibility or frangible behavior of the glass articles.

Figure 4:
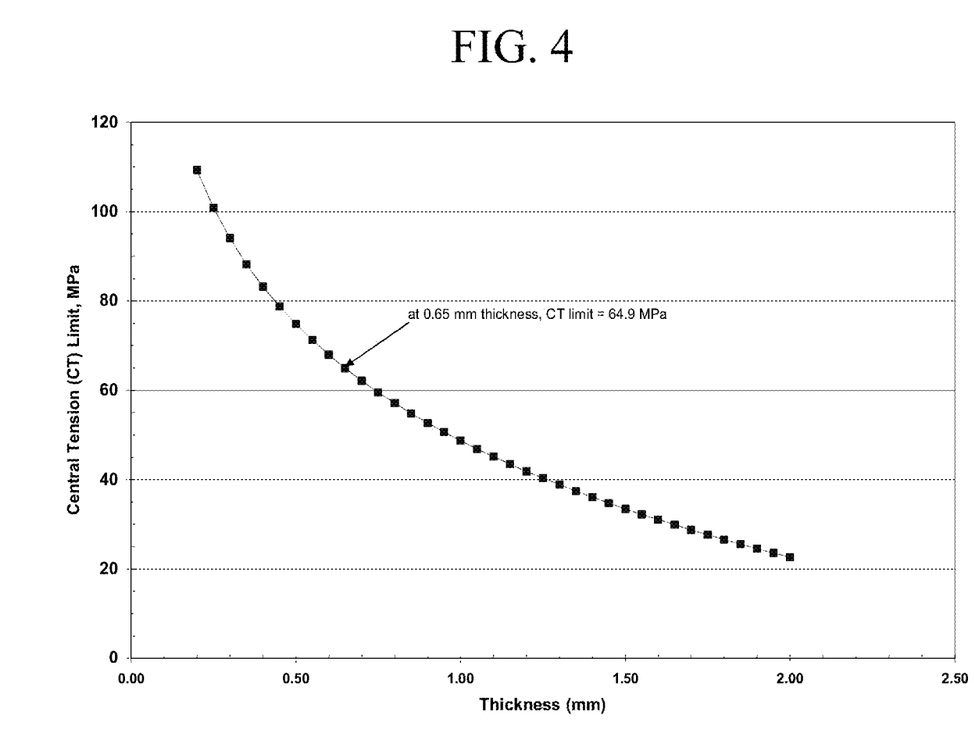
FIG. 4 is a plot of the frangibility limit $CT_{limit}$ for traditionally strengthened glass having a compressive stress profile that follows a complementary error function as a function of thickness t.

The limits of compressive stress CS and depth of layer DOL are determined by the various allowable combinations that follow the complimentary error function and remain below the frangibility limit. FIG. 4 is a plot of the frangibility limit $CT_{limit}$, for traditionally strengthened glass having a compressive stress profile that follows a complementary error function as a function of thickness t, as taught by U.S. Pat. No. 8,075,999. Glass articles are frangible above the line shown in FIG. 4. Central tension CT may be determined from the compressive stress CS, depth of layer DOL, and thickness t of the glass using the equation:

$$CT=(CS \cdot DOL)/(t-2 \cdot DOL), \quad (1)$$

which represents the upper limit of central tension CT with respect to a triangle approximation of the error function profile. The $CT_{limit}$ for traditionally strengthened glass (i.e., glasses in which the compressive stress profile is characterized by a single complementary error function) for a given thickness t of glass can be determined by the equation $$CT_{limit}(MPa)=-37.6(MPa/mm) \cdot \ln(t)(mm)+48.7(MPa), \quad (2)$$

where the $CT_{limit}$, glass thickness t is expressed in millimeters (mm), where t≤1 mm, and ln(t) is the natural logarithm (base e) of the thickness t.

Therefore in order to stay below the frangibility limit for traditionally strengthened glass having a complementary error function compressive stress profile the following is required for CS and DOL as shown in Equation 3:

$$(CS \cdot DOL)/(t-2 \cdot DOL) \leq CT_{limit}. \quad (3)$$

The glasses and methods described herein provide compressive stress profiles that allow a combination of higher surface compressive stress and deeper depth of layer than would be otherwise be allowable when using a complementary error function profile. As shown in Equation 3, $CT_{limit}$ is still calculated from a triangle approximation of a traditional complimentary error function profile, but the central tension CT of the glasses described herein may exceed $CT_{limit}$:

$$(CS \cdot DOL)/(t-2 \cdot DOL)>CT_{limit}. \quad (4)$$

The glasses described herein may comprise or consist of any glass that is chemically strengthened by ion exchange. In some embodiments, the glass is an alkali aluminosilicate glass.

In one embodiment, the alkali aluminosilicate glass comprises: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol %≤$SiO_2$+$B_2O_3$+CaO≤69 mol %; $Na_2O$+$K_2O$+$B_2O_3$+MgO+CaO+SrO>10 mol %; 5 mol % MgO+CaO+SrO≤8 mol %; ($Na_2O$+$B_2O_3$)–$Al_2O_3$≥2 mol %; 2 mol % $Na_2O$≤$Al_2O_3$≤6 mol %; and 4 mol %≤($Na_2O$+$K_2O$)–$Al_2O_3$≤10 mol %. The glass is described in U.S. Pat. No. 7,666,511 by Adam J. Ellison et al., entitled "Down-Drawable, Chemically Strengthened Glass for Cover Plate," filed Jul. 27, 2007, and claiming priority to U.S. Provisional Patent Application No. 60/930,808, filed on May 18, 2007, the contents of which are incorporated herein by reference in their entirety.

In another embodiment, the alkali aluminosilicate glass comprises: at least one of alumina and boron oxide, and at least one of an alkali metal oxide and an alkali earth metal oxide, wherein –15 mol %≤($R_2O$+R'O–$Al_2O_3$–$ZrO_2$)–$B_2O_3$≤4 mol %, where R is one of Li, Na, K, Rb, and Cs, and R' is one of Mg, Ca, Sr, and Ba. In some embodiments, the alkali aluminosilicate glass comprises: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. The glass is described in U.S. patent application Ser. No. 12/277,573 by Matthew J. Dejneka et al., entitled "Glasses Having Improved Toughness And Scratch Resistance," filed Nov. 25, 2008, and claiming priority to U.S. Provisional Patent Application No. 61/004,677, filed on Nov. 29, 2008, the contents of which are incorporated herein by reference in their entirety.

In another embodiment, the alkali aluminosilicate glass comprises: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %. The glass is described in U.S. patent application Ser. No. 12/392,577 by Sinue Gomez et al., entitled "Fining Agents for Silicate Glasses," filed Feb. 25, 2009, and claiming priority to U.S. Provisional Patent Application No. 61/067,130, filed on Feb. 26, 2008, the contents of which are incorporated herein by reference in their entirety.

In another embodiment, the alkali aluminosilicate glass comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009, the contents of which are incorporated herein by reference in their entirety.

In another embodiment, the alkali aluminosilicate glass comprises at least 50 mol % $SiO_2$ and at least one modifier selected from the group consisting of alkali metal oxides and alkaline earth metal oxides, wherein $[(Al_2O_3 (mol\%)+B_2O_3 (mol\%))/(\Sigma$ alkali metal modifiers (mol %))]>1. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. The glass is described in U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767, filed on Aug. 21, 2009, the contents of which are incorporated herein by reference in their entirety.

In another embodiment, the alkali aluminosilicate glass comprises $SiO_2$, $Al_2O_3$, $P_2O_5$, and at least one alkali metal oxide ($R_2O$), wherein $0.75 \leq [(P_2O_5 (mol\%)+R_2O (mol\%))/M_2O_3 (mol\%)] \leq 1.2$, where $M_2O_3=Al_2O_3+B_2O_3$. In some embodiments, the alkali aluminosilicate glass comprises: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010, the contents of which are incorporated herein by reference in their entirety.

In still other embodiments, the alkali aluminosilicate glass comprises at least about 4 mol % $P_2O_5$, wherein $(M_2O_3(mol\%)/R_xO (mol\%))<1$, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$. The glass is described in U.S. Provisional Patent Application No. 61/560,434 by Timothy M. Gross, entitled "Ion Exchangeable Glass with High Crack Initiation Threshold," filed Nov. 16, 2011, the contents of which are incorporated herein by reference in their entirety.

In still another embodiment, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340+27.1 \cdot Al_2O_3 - 28.7 \cdot B_2O_3 + 15.6 \cdot Na_2O - 61.4 \cdot K_2O + 8.1 \cdot (MgO+ZnO) \geq 0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. Provisional Patent Ion Application No. 61/503,734 by Matthew J. Dejneka et al., entitled "Ion Exchangeable Glass with High Compressive Stress," filed Jul. 1, 2011, the contents of which are incorporated herein by reference in their entirety.

In some embodiments, the alkali aluminosilicate glasses described hereinabove are substantially free of (i.e., contain 0 mol % of) of at least one of lithium, boron, barium, strontium, bismuth, antimony, and arsenic.

In some embodiments, the alkali aluminosilicate glasses described hereinabove are down-drawable by processes known in the art, such as slot-drawing, fusion drawing, re-drawing, and the like, and has a liquidus viscosity of at least 130 kilopoise.

A method of providing a glass with a compressive stress profile that does not follow a complementary error function, such as those glasses described hereinabove, is also provided. The glass is first ion exchanged with an ion exchange medium. The ion exchange medium may be a molten salt bath, a gel, a paste, or the like, and comprises a salt that comprises a first cation. The first cation replaces a second, smaller cation in the glass to a first depth of layer, creating a first compressive stress within the first depth of layer. The first compressive stress varies with distance into the glass according to a complementary error function. This step can be modified to fix the starting compressive stress and depth of layer at any desirable level, and does not need to be constrained by the frangibility limit $CT_{limit}$.

Following ion exchange, the surface compressive stress is relaxed and the first ions are diffused deeper into the glass to a second depth of layer that is greater than the first depth of layer. In some embodiments, this step comprises heating the glass at a temperature that is less than the strain point of the glass. The step of heating the ion exchanged glass to this temperature results in a local maximum of compressive stress at a depth below the surface—i.e., a compressive stress maximum that is "buried" below the surface of the glass.

Following the step in which the surface compressive stress of the glass is relaxed, the glass is again ion exchanged to re-establish the surface compressive stress. As with the first ion exchange step, the ion exchange is carried out by bringing the glass into contact with a medium, which may be a molten salt bath, a gel, a paste, or the like, and comprises a salt that comprises a first cation to create a second surface compressive stress in the glass. In some embodiments, the second ion exchange is carried out for a shorter period of time than the first ion exchange.

The compressive stress profile (i.e., the variation of compressive stress CS) obtained after the second ion exchange of the glass varies according to a function other than—and different from—a complementary error function, and may take the form of those functions previously described hereinabove and shown in the accompanying figures.

The glasses and method described herein achieve higher combinations of CS and DOL while remaining under the frangibility limit. Instances where a buried increase or local maximum of compressive stress is achieved can result in re-direction of cracking systems. Higher compressive stress also allows the glass to pass handling, ball drop, and as made ring-on-ring strength testing. The deeper depth of compressive stress layer also provides damage resistance; i.e. the ability to retain strength as the flaw depths become larger with more severe contacts.

Examples

The following examples illustrate the features and advantages of the glass and methods described herein and are in no way intended to limit the disclosure or appended claims thereto.

Four examples of glasses having the nominal composition: 69 mol % $SiO_2$; 10 mol % $Al_2O_3$; 14 mol % $Na_2O$; 1. mol % $K_2O$; 6 mol % MgO; 0.5 mol % CaO; 0.01 mol % $ZrO_2$; 0.2 mol % $SnO_2$; and 0.01 mol % $Fe_2O_3$ were prepared and ion exchanged according to the methods described herein to achieve stress profiles that do not follow a single complementary error function. Stress measurements and depth profiles were made using interferometry on 650 μm diameter rods of the ion exchanged glass. The method was limited to measuring stresses inside the first 5-10 μm of the rods. Corrections for surface compression were done using FSM measurements on 1.3 mm thick flat glass samples.

The method consisted of three steps. The first step was to ion-exchange the glass to contain a standard complementary error function stress profile. Ion exchange Step 1 for the samples shown in FIGS. 4-6 was an 8 hour immersion treatment in a $KNO_3$ salt bath at 410° C., which resulted in typical complimentary error function profile with a DOL of 44 microns and a CS of 595 MPa for each sample. This treatment resulted in a depth of layer (DOL) of about 44 μm and a compressive stress (CS) of about 595 MPa, although Step 1 may be modified to fix the starting CS and DOL at any desirable level and does not need to be constrained by the central tension $CT_{limit}$ established by frangibility testing.

In Step 2 the ion exchanged glass samples were heat treated at a temperature below the strain point of the glass for a desired amount of time to promote diffusion of potassium to extend the depth of the DOL, while at the same time relaxing the surface compressive stress in the samples. This step results in a compressive stress maximum "buried" beneath the surface of the glass rather than at the surface. The samples shown in FIGS. 5-7, were heat treated at 500° C. for 90 minutes in a $N_2$ atmosphere, which resulted in an extension of the DOL beyond the DOL achieved in Step 1. The choice of heat treatment temperature and time depends on the rate of stress relaxation and rate of diffusion for a given glass composition at a given temperature.

Figure 5:
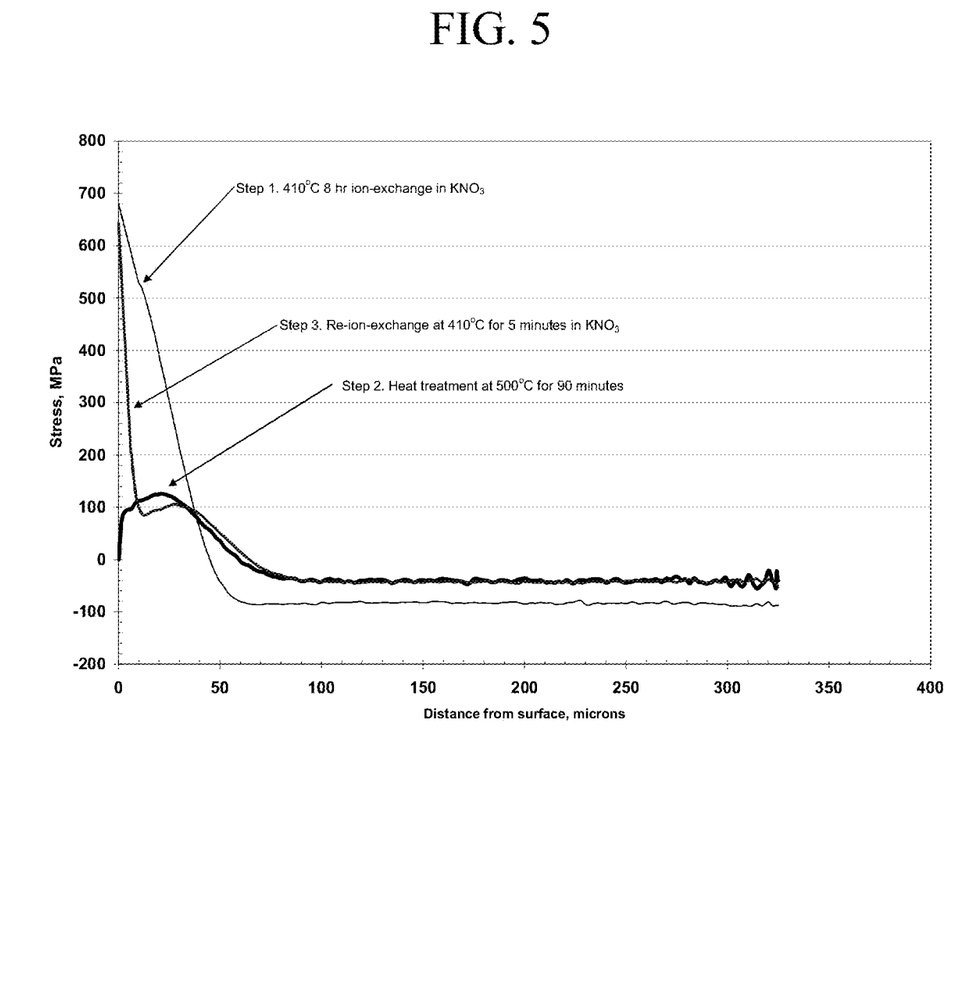
FIG. 5 is a plot of compressive stress vs. thickness for glass samples that were 1) ion exchanged at 410° C. for 8 hours in $KNO_3$ salt; 2) heat treated at 500° C. for 90 minutes; and 3) re-ion-exchanged at 410° C. for 5 minutes in $KNO_3$ salt.

In Step 3, a second ion-exchange for short amounts of time re-establishes the surface compressive stress. In FIG. 5, the second ion-exchange at 410° C. for 5 minutes resulted in a CS spike at the surface and a buried region of increasing CS from the overlapping of profiles from Steps 2 and 3. Step 3 also resulted in a buried compression layer total DOL of about 64 nm and a CS of about 684 MPa.

Figure 6:
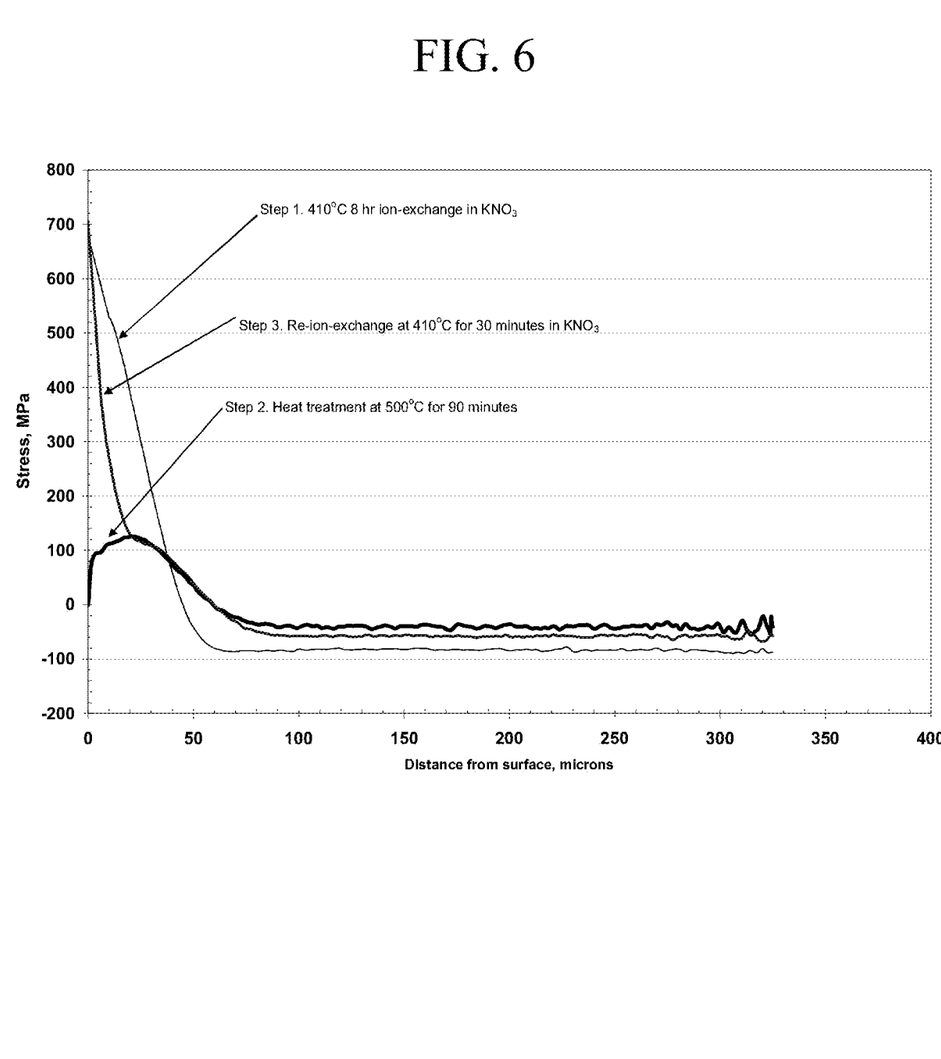
FIG. 6 is a plot of compressive stress vs. thickness for glass samples that were 1) ion exchanged at 410° C. for 8 hours in $KNO_3$ salt; 2) heat treated at 500° C. for 90 minutes; and 3) re-ion-exchanged at 410° C. for 30 minutes in $KNO_3$ salt.

In FIG. 6, the second ion-exchange at 410° C. for 30 minutes resulted in a higher CS at the surface and a shoulder appears from the overlapping of profiles from Steps 2 and 3. Step 3 also resulted in a buried compression layer total having DOL of about 59 microns and a CS of about 744 MPa.

Figure 7:
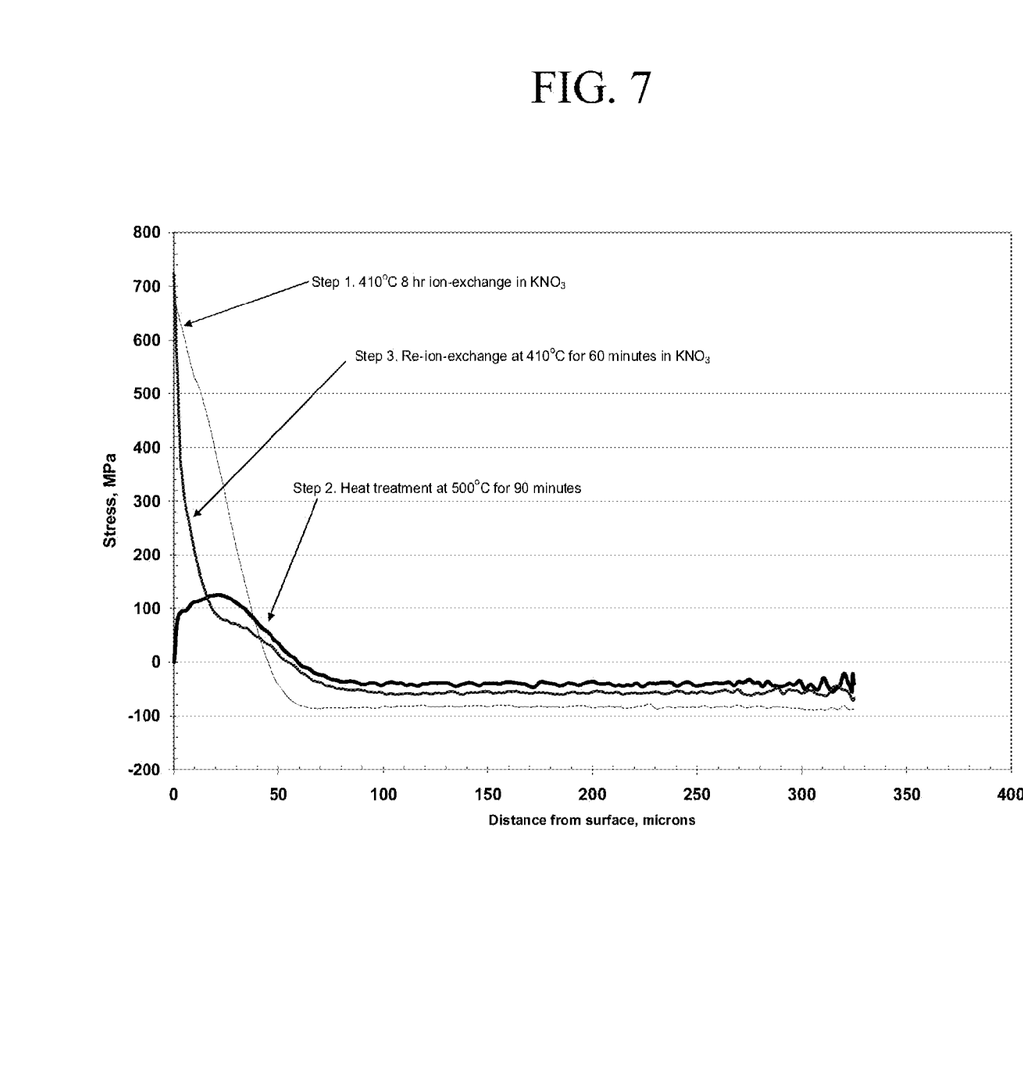
FIG. 7 is a plot of compressive stress vs. thickness for glass samples that were 1) ion exchanged at 410° C. for 8 hours in $KNO_3$ salt; 2) heat treated at 500° C. for 90 minutes; and 3) re-ion-exchanged at 410° C. for 60 minutes in $KNO_3$ salt.

In FIG. 7, the second ion-exchange at 410° C. for 60 minutes resulted in a profile with the surface CS spike extending deeper into the glass. Step 3 also resulted in a buried compression layer total having DOL of about 55 microns and a CS of about 749 MPa.

Figure 8:
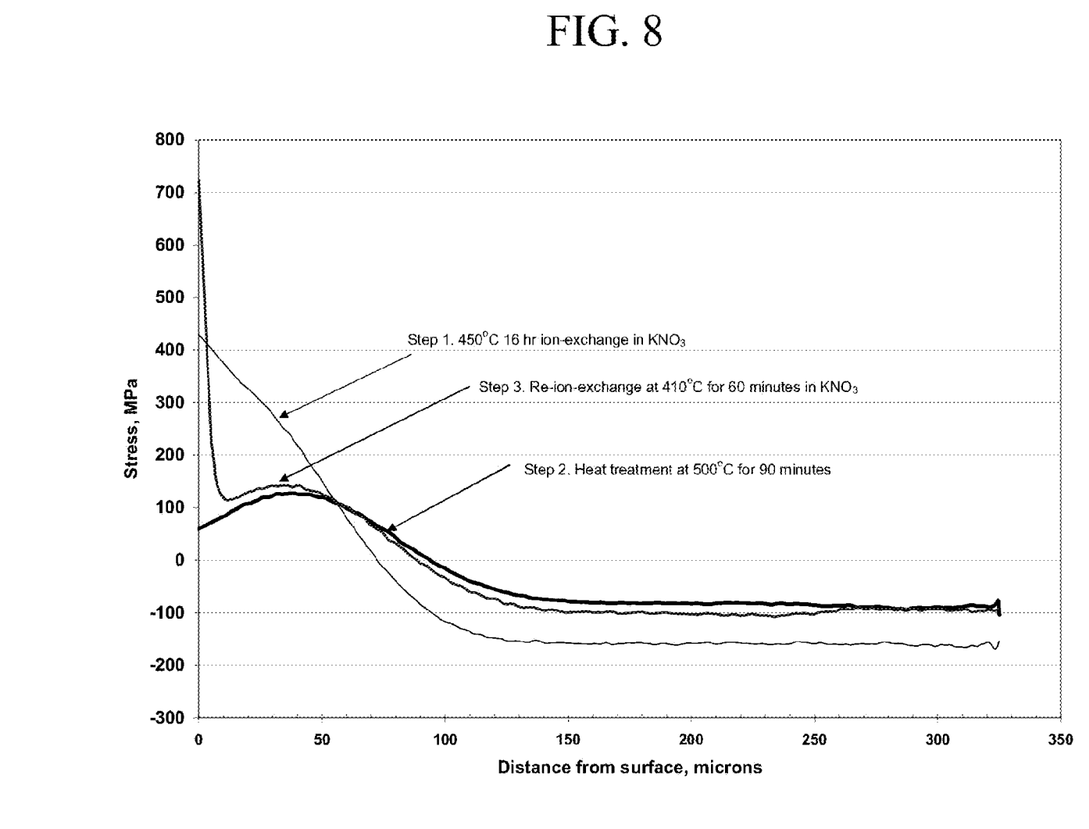
FIG. 8 is a plot of compressive stress vs. thickness for glass samples that were 1) ion exchanged at 410° C. for 16 hours in $KNO_3$ salt; 2) heat treated at 500° C. for 90 minutes; and 3) re-ion-exchanged at 410° C. for 60 minutes in $KNO_3$ salt.

The glass samples shown in FIG. 8 were ion-exchanged in Step 1 for 16 hours in $KNO_3$ salt at 450° C., resulting in typical complimentary error function profile. In Step 2, the glass samples were heat treated at 500° C. for 90 minutes to relax the compressive stress at the surface and drive diffusion of potassium ions to greater depth resulting in deeper depth of compressive layer. In Step 3, the samples were re-ion-exchanged for 60 minutes in $KNO_3$ salt at 410° C. salt to re-establish high surface compression. Step 3 also resulted in a buried compression layer total having DOL of about 90 μm and a CS of about 740 MPa.

Figure 9:
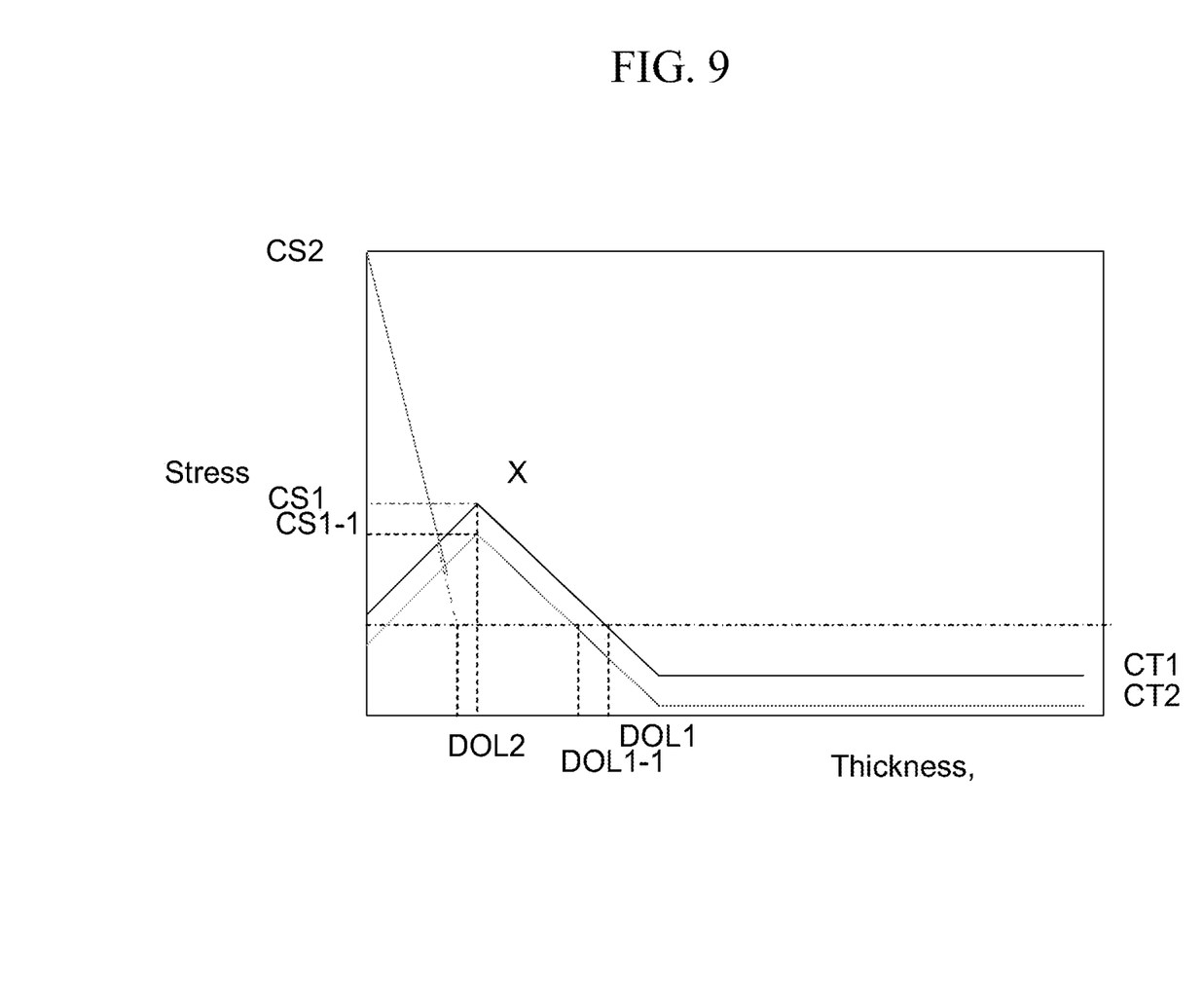
FIG. 9 is a plot of modeled examples of compressive stress profiles for an ion exchanged glass.

Modeled examples of compressive stress profiles for flat glass are shown in FIG. 9. The overall stress A, expressed as a function A(L) of depth L can be described as $$A(L)=(A1 \cdot Erf(L/b1)-CT1) \cdot (1-Exp(-(L/b2)^{1.2}))+A2 \cdot Erf(L/b3)-CT2. \quad (5)$$

The term A1 is the peak compressive stress after the first ion exchange step without considering a stress relaxation effect contribution, CT1 is the compressive stress after the first ion exchange step and subsequent relaxation step, and b1 and Erf(L/b1) are the depth of the ion exchanged layer and the error function of the stress profile, respectively, associated with the first ion exchange step. The term b2 is the depth of stress relaxation after the first ion exchange step. A2 is the peak compressive stress after the stress relaxation step, which follows the first ion exchange step. The terms b3 and CT2 are the depth of the ion exchanged layer and the central tension adjustment, respectively, after the second ion exchange step.

Using equation (1), the central tension CT1 after the first ion exchange and subsequent relaxation step is given by the equation $$CT1=(CS1 \cdot DOL1)/(t-2 \cdot DOL1). \quad (6)$$

where compressive stress CS1 is the peak value or local maximum (X in FIG. 9) of the compressive stress that is "buried (i.e., located beneath the surface of the glass)" at DOL2 in the compressive layer. Following the second ion exchange step, the central tension decreases to a second value CT2, CS1 and DOL1 decrease to CS1-1 and DOL1-1, respectively, and a maximum compressive stress CS2 is achieved at the surface (thickness=0):

$$CT2=(CS2 \cdot DOL2)/(t-2 \cdot DOL2), \quad (7)$$

In some embodiments, the total tensile stress CT=CT1+CT2 should be less than or equal to the frangibility limit $CT_{limit}$ (equation (3)). The total tensile stress CT is obtained by adding equations (6) and (7):

$$CT=(CS1 \cdot DOL1)/(t-2 \cdot DOL1)+(CS2 \cdot DOL2)/(t-2 \cdot DOL2). \quad (8)$$

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass having a surface and a thickness t, in a range from 0.05 mm to 1.3 mm, the glass comprising:
   a first region under a compressive stress, the first region extending from the surface to a depth of layer DOL in the glass, wherein the compressive stress CS has a maximum $CS_1$ at the surface and varies with distance d from the surface according to a function other than a complementary error function; and
   a second region under a tensile stress CT, the second region extending from the depth of layer into the glass, wherein the glass has a frangibility limit $CT_{limit}$, expressed in MPa, greater than −37.6ln(t)(MPa)+48.7(MPa).

2. The glass of claim 1, wherein the first region comprises:
a. a first segment, the first segment extending from the surface to a first depth $d_1$, wherein the depth $d_1$ is less than the depth of layer DOL, wherein the compressive stress CS in the first segment varies according to a first function; and
b. a second segment, the second segment extending from the first depth $d_1$ up to the depth of layer DOL, wherein the compressive stress CS in the second segment varies according to a second function, and wherein the first function is different than the second function.

3. The glass of claim 2, wherein the first function is a first complementary error function.

4. The glass of claim 3, wherein the second function is a second complementary error function or a diffusion tail.

5. The glass of claim 2, wherein the compressive stress has a local maximum $CS_2$ in the second segment wherein $CS_1 > CS_2$.

6. The glass of claim 1, wherein the glass is an alkali aluminosilicate glass.

7. The glass of claim 1, wherein the maximum compressive stress $CS_1$ is at least about 400 MPa.

8. The glass of claim 1, wherein the depth of layer DOL is at least about 40 μm.

9. The glass of claim 1, wherein the glass is ion exchanged.

10. An ion exchanged glass having a surface and a thickness t, in a range from 0.05 mm to 1.3 mm, the glass comprising a first region under a compressive stress CS and extending to a depth of layer DOL in the glass and second region under a tensile stress CT, the second region extending from the depth of layer into the glass, wherein the glass has a frangibility limit $CT_{limit}$, expressed in MPa, greater than $-37.6\ln(t)(MPa)+48.7(MPa)$, the first region comprising a first segment in which the compressive stress CS varies according to a first error function, the first segment having a maximum compressive stress $CS_1$ at the surface and extending from the surface to a first depth $d_1$, wherein the depth $d_1$ is less than the depth of layer DOL, and a second segment in which the compressive stress CS varies according to a second function, the second segment extending from the first depth $d_1$ up to the depth of layer DOL, wherein the first error function is different than the second function.

11. The ion exchanged glass of claim 10, wherein the second function is a second complementary error function or a diffusion tail.

12. The ion exchanged glass of claim 10, wherein the compressive stress has a local maximum $CS_2$ in the second segment and wherein $CS_1 > CS_2$.

13. The ion exchanged glass of claim 10, wherein the compressive stress CS is at least about 400 MPa.

14. The ion exchanged glass of claim 10, wherein the depth of layer DOL is at least about 40 μM.

15. The ion exchanged glass of claim 10, wherein the glass is an alkali aluminosilicate glass.

16. A method of providing a glass with a compressive stress in a layer extending from a surface of the glass to a depth of layer in the glass and a tensile region extending from the depth of layer into the glass, the method comprising:
ion exchanging the glass with a salt comprising first cations to a first compressive stress and a first depth of layer, wherein the first compressive stress varies with distance in the glass according to a complementary error function;
relaxing stresses within the glass and diffusing the first cations deeper into the glass; and
re-ion exchanging the glass with a salt comprising the first cations to a second compressive stress at the surface, wherein the compressive stress has a maximum value at the surface and varies with distance according to a function other than the complementary error function, wherein the glass has a thickness t in a range from 0.05 mm to 1.3 mm and a frangibility limit $CT_{limit}$, expressed in MPa, greater than $-37.6\ln(t)(MPa)+48.7(MPa)$.

17. The method of claim 16, wherein relaxing stresses within the glass and diffusing the first cations deeper into the glass comprises heating the glass at a temperature below a strain point of the glass.

* * * * *